(12) United States Patent
Ragazzi et al.

(10) Patent No.: US 9,863,671 B2
(45) Date of Patent: Jan. 9, 2018

(54) HEAT PUMP ASSISTED ENGINE COOLING FOR ELECTRIFIED VEHICLES

(71) Applicant: FORD GLOBAL TECHNOLOGIES, LLC, Dearborn, MI (US)

(72) Inventors: Franco Ragazzi, Ann Arbor, MI (US); James George Gebbie, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 447 days.

(21) Appl. No.: 14/445,333

(22) Filed: Jul. 29, 2014

(65) Prior Publication Data

US 2016/0033175 A1  Feb. 4, 2016

(51) Int. Cl.

| F25B 13/00 | (2006.01) |
|---|---|
| F25B 49/02 | (2006.01) |
| B60H 1/00 | (2006.01) |
| B60H 1/32 | (2006.01) |
| F25B 30/02 | (2006.01) |
| F25B 41/04 | (2006.01) |
| F25B 40/04 | (2006.01) |

(52) U.S. Cl.
CPC ......... *F25B 13/00* (2013.01); *B60H 1/00385* (2013.01); *B60H 1/00921* (2013.01); *B60H 1/3213* (2013.01); *F25B 30/02* (2013.01); *F25B 41/04* (2013.01); *F25B 49/02* (2013.01); *F25B 40/04* (2013.01); *F25B 2339/047* (2013.01); *F25B 2341/066* (2013.01)

(58) Field of Classification Search
CPC .......... F25B 13/00; F25B 49/02; F25B 30/02; F25B 41/04; F25B 2341/066; F25B 40/04; F25B 2339/047; B60H 1/00385; B60H 1/0092; B60H 1/3213
USPC ................................................. 62/115, 324.1
See application file for complete search history.

(56) References Cited

U.S. PATENT DOCUMENTS

| 5,264,764 A | * | 11/1993 | Kuang | ..................... B60K 6/46 |
|---|---|---|---|---|
| | | | | 180/65.245 |
| 6,722,147 B2 | | 4/2004 | Heyl et al. | |
| 7,789,176 B2 | | 9/2010 | Zhou | |
| 8,336,319 B2 | | 12/2012 | Johnston et al. | |
| 2004/0194949 A1 | * | 10/2004 | Ban | ..................... B60H 1/00314 |
| | | | | 165/287 |
| 2005/0224221 A1 | * | 10/2005 | Feuerecker | ........ B60H 1/00914 |
| | | | | 165/202 |
| 2009/0095005 A1 | | 4/2009 | Dietrich et al. | |
| 2010/0131106 A1 | * | 5/2010 | Kriangkanont | ......... F25B 49/02 |
| | | | | 700/275 |
| 2011/0132291 A1 | * | 6/2011 | Ulrey | ..................... F01P 7/167 |
| | | | | 123/41.1 |
| 2012/0111036 A1 | * | 5/2012 | Campbell | ............. F25B 25/005 |
| | | | | 62/115 |

(Continued)

FOREIGN PATENT DOCUMENTS

| JP | S6226114 A | 2/1997 |
|---|---|---|
| KR | 20130101263 A | 9/2013 |
| WO | 2013079382 A1 | 6/2013 |

*Primary Examiner* — Mohammad M Ali
(74) *Attorney, Agent, or Firm* — Carlson, Gaskey & Olds

(57) ABSTRACT

A method including controlling a climate control system of an electrified vehicle to cool a coolant of a coolant subsystem with a refrigerant of a heat pump subsystem in response to a temperature of the coolant exceeding a predefined threshold.

20 Claims, 3 Drawing Sheets

(56) References Cited

U.S. PATENT DOCUMENTS

2012/0304674 A1* 12/2012 Schwarzkopf ..... B60H 1/00385
62/79
2012/0318012 A1   12/2012 Choi et al.
2013/0146251 A1    6/2013 Benouali et al.
2013/0333395 A1   12/2013 Morita
2014/0053579 A1    2/2014 Shaikh et al.
2014/0069123 A1    3/2014 Kim

* cited by examiner

HEAT PUMP ASSISTED ENGINE COOLING FOR ELECTRIFIED VEHICLES

TECHNICAL FIELD

This disclosure relates to methods and systems for dissipating heat of an engine of an electrified vehicle using a heat pump subsystem of a climate control system. During certain conditions, the climate control system can be controlled to dissipate a portion of the engine heat by transferring heat from a coolant of a coolant subsystem into a refrigerant of the heat pump subsystem.

BACKGROUND

Electrified vehicles, such as hybrid electric vehicles (HEV's), plug-in hybrid electric vehicles (PHEV's), or fuel cell vehicles differ from conventional motor vehicles because they are powered by electric machines (i.e., electric motors and/or generators) instead of or in addition to an internal combustion engine. High voltage current for powering these types of electric machines is typically supplied by one or more high voltage battery assemblies.

Some electrified vehicles are equipped with a climate control system that employs a heat pump subsystem for warming, cooling and/or dehumidifying a passenger cabin, and a coolant subsystem for cooling an engine. It is desirable to improve operation of the climate control system during certain conditions.

SUMMARY

A method according to an example of the present disclosure includes controlling a climate control system of an electrified vehicle to cool a coolant of a coolant subsystem with a refrigerant of a heat pump subsystem in response to a temperature of the coolant exceeding a predefined threshold.

In a further embodiment of any of the foregoing methods, the controlling step includes transferring heat from the coolant to the refrigerant in an intermediate heat exchanger that is disposed as part of both the coolant subsystem and the heat pump subsystem, and releasing the heat to ambient air via an outside heat exchanger of the heat pump subsystem.

In a further embodiment of any of the foregoing methods, the controlling step includes turning on an auxiliary pump to circulate the coolant through a radiator of the coolant subsystem.

In a further embodiment of any of the foregoing methods, the controlling step includes opening a valve of the coolant subsystem in order to maintain flow of the coolant through an engine.

In a further embodiment of any of the foregoing methods, the controlling step includes operating the heat pump subsystem by communicating the refrigerant through a compressor, an intermediate heat exchanger, an expansion valve, a solenoid valve, an outside heat exchanger, and an accumulator.

In a further embodiment of any of the foregoing methods, the controlling step includes operating a compressor at low or medium speed.

In a further embodiment of any of the foregoing methods, the method includes monitoring a difference between an inlet temperature of the coolant at an intermediate heat exchanger and a discharge temperature of the refrigerant at a compressor.

In a further embodiment of any of the foregoing methods, the method includes ending the controlling step if a temperature of the refrigerant exceeds the temperature of the coolant.

In a further embodiment of any of the foregoing methods, the controlling step includes commanding operation of the heat pump subsystem in an engine cooling assist mode in response to the temperature of the coolant exceeding the predefined threshold.

In a further embodiment of any of the foregoing methods, the heat pump subsystem is a vapor compression heat pump system.

A method according to an example of the present disclosure includes monitoring a temperature of a coolant of an engine of an electrified vehicle, removing heat from the coolant into a refrigerant if a temperature of the coolant exceeds a predefined threshold, and dissipating the heat from the refrigerant to ambient air.

In a further embodiment of any of the foregoing methods, the removing step includes exchanging heat between the coolant and the refrigerant within a heat exchanger.

In a further embodiment of any of the foregoing methods, the dissipating step includes communicating the heated refrigerant through an outside heat exchanger.

In a further embodiment of any of the foregoing methods, the coolant is part of a coolant subsystem and the refrigerant is part of a heat pump subsystem.

In a further embodiment of any of the foregoing methods, the method includes at least one of opening a valve to bypass flow of the coolant through the engine, turning on an auxiliary pump to circulate the coolant through a radiator, and operating a compressor at low or medium speed.

A climate control system for an electrified vehicle according to an example of the present disclosure includes a coolant subsystem that circulates a coolant to cool an engine, a heat pump subsystem that circulates a refrigerant, and a controller configured to operate the climate control system in an engine cooling assist mode in which the coolant transfers heat to the refrigerant in response to a temperature of the coolant exceeding a predefined threshold.

In a further embodiment of any of the foregoing systems, the coolant subsystem includes a coolant pump, a radiator, at least one valve, an intermediate heat exchanger, and a heater core.

In a further embodiment of any of the foregoing systems, the heat pump subsystem includes a compressor, an intermediate heat exchanger, a first expansion device, a solenoid valve, an outside heat exchanger, a three-way valve, a second expansion device and an accumulator.

In a further embodiment of any of the foregoing systems, the system includes an intermediate heat exchanger fluidly connected to both the coolant subsystem and the heat pump subsystem and adapted to effectuate heat transfer between the coolant and the refrigerant.

In a further embodiment of any of the foregoing systems, the heat pump subsystem includes an outside heat exchanger that dissipates the heat to ambient air.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to an electrified vehicle climate control system operable in an engine cooling assist mode to dissipate heat generated by the engine. For example, in some embodiments, the climate control system is controlled to cool a coolant of a coolant subsystem with a refrigerant of a heat pump subsystem when a temperature of the coolant exceeds a predefined threshold. Heat is exchanged between the coolant and the refrigerant in an intermediate heat exchanger and is then released to ambient air in an outside heat exchanger of the heat pump subsystem. These and other features are discussed in greater detail in the paragraphs that follow.

Figure 1:
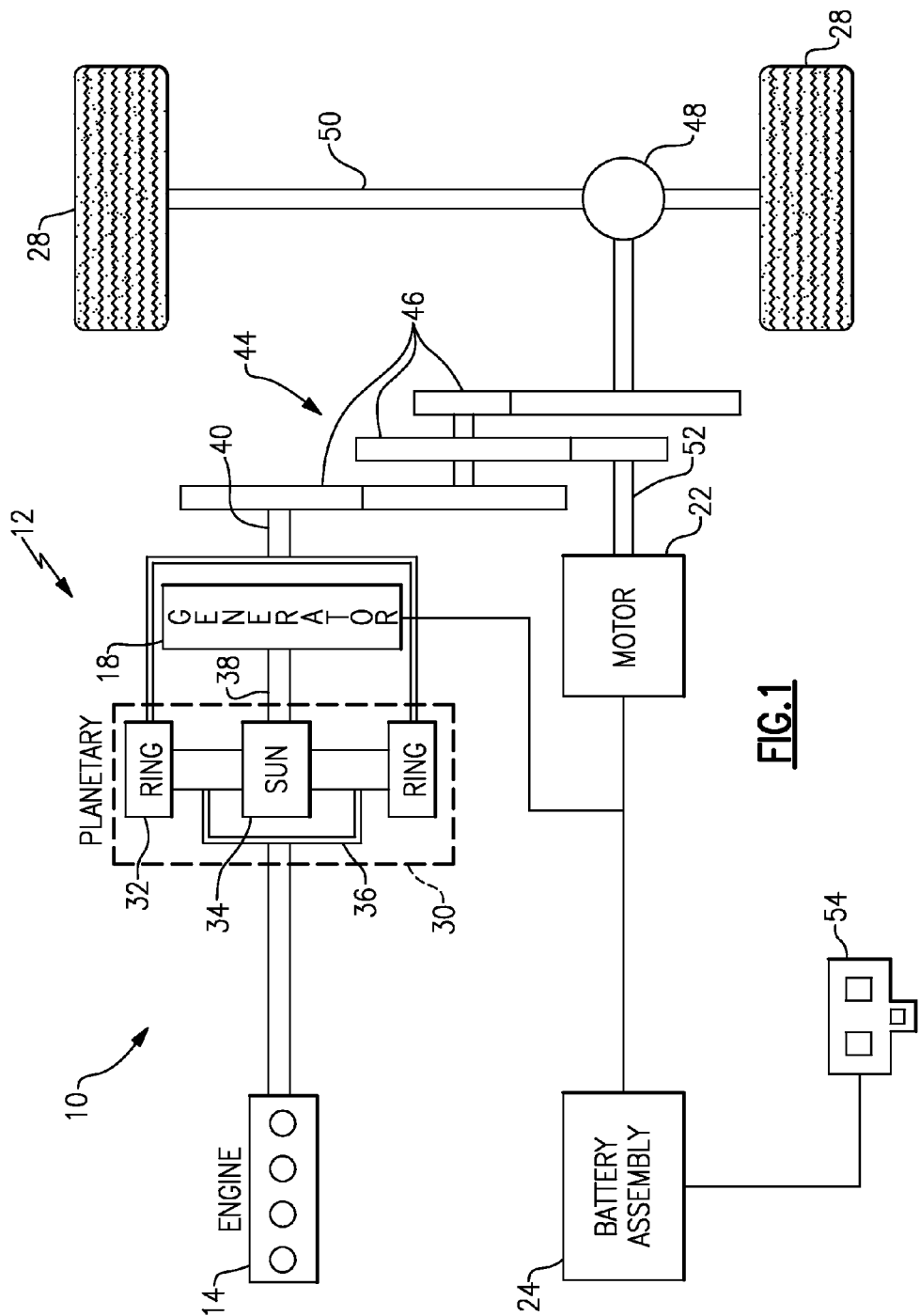
FIG. 1 schematically illustrates the powertrain of an electrified vehicle.

FIG. 1 schematically illustrates a powertrain 10 of an electrified vehicle 12. Although depicted as a PHEV in this embodiment, it should be understood that the concepts of this disclosure are not limited to PHEV's and could extend to other electrified vehicles, including, but not limited to, HEV's.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery assembly. The battery assembly 24 may include a high voltage battery pack that is capable of outputting electrical power to operate the motor 22 and the generator 18. Other types of energy storage devices and/or output devices can also be used to electrically power the electrified vehicle 12.

In a non-limiting PHEV embodiment of the electrified vehicle 12, the battery assembly 24 may be recharged or partially recharged using a charging adapter 54 that is connected to a charging station powered by an external power source, such as an electrical grid, a solar panel, or the like.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally not permitted to operate under a default EV mode but could be operated as necessary based on a vehicle system state or as permitted by the operator.

The electrified vehicle 12 may additionally be operated in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes.

Figure 2:
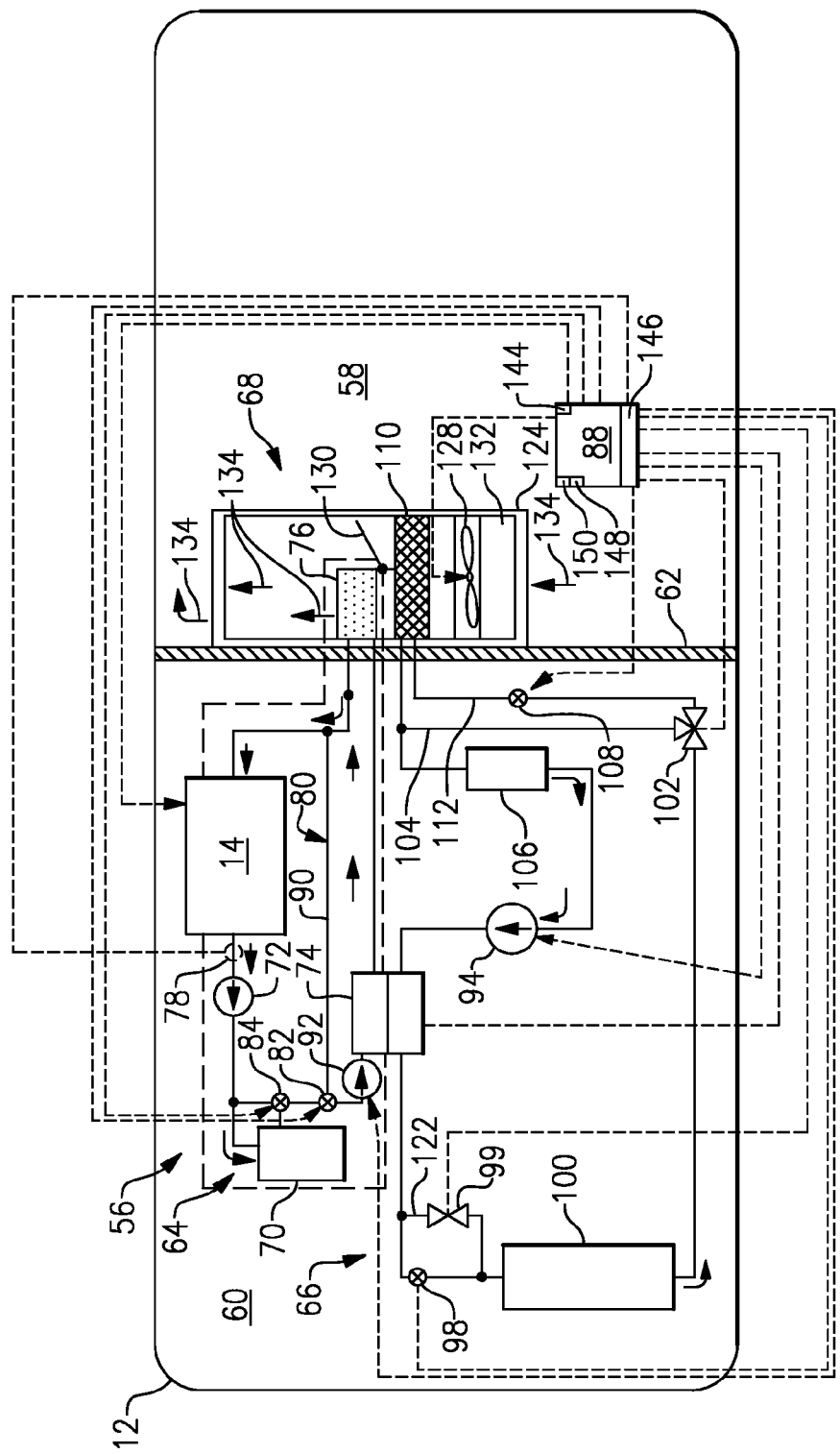
FIG. 2 schematically illustrates a climate control system of an electrified vehicle.

FIG. 2 illustrates a climate control system 56 of an electrified vehicle, such as the electrified vehicle 12 of FIG. 1. However, this disclosure extends to other electrified vehicles and is not limited to the specific configuration shown in FIG. 1. In FIG. 2, devices and fluidic passages or conduits are shown in solid lines, and electrical connections are shown as dashed lines.

In one embodiment, the electrified vehicle 12 includes a passenger compartment 58, an engine compartment 60, and the climate control system 56. The passenger compartment 58 may be located inside the electrified vehicle 12 and can receive one or more occupants. A portion of the climate control system 56 may be disposed within the passenger compartment 58.

Engine compartment 60 is positioned proximate to the passenger compartment 58. One or more power sources, such as an internal combustion engine 14, as well as a portion of the climate control system 56 may be housed within the engine compartment 60. The engine compartment 60 may be isolated from the passenger compartment 58 via a bulkhead 62. The climate control system 56 can circulate air and/or control or modify the temperature of air that is circulated in the passenger compartment 58. The engine 14 can also be thermally managed by the climate control system 56 to reduce fuel consumption and emissions, for example.

The climate control system 56 may include a coolant subsystem 64, a heat pump subsystem 66, and a ventilation subsystem 68. Each of these systems is described in detail below.

The coolant subsystem 64, or coolant loop, may circulate a coolant, such as glycol, to cool the engine 14. For example, waste heat generated by the engine 14 when the engine is operational may be transferred to the coolant and then circulated to a radiator 70 to cool the engine 14. In one embodiment, the coolant subsystem 64 includes a coolant pump 72, an intermediate heat exchanger 74, a heater core 76, and a bypass loop 80 that may be fluidly interconnected by conduits or passages such as tubes, hoses, pipes and/or the like. The radiator 70 transfers thermal energy from the coolant to the ambient air surrounding the electrified vehicle 12.

The coolant subsystem 64 may additionally include valves 82, 84 for selectively adjusting the flow of coolant through the engine 14, the radiator 70, the intermediate heat exchanger 74, and/or the heater core 76. In one embodiment, the valves 82, 84 are electrically operated valves that are selectively actuated via a controller 88. Other types of valves could alternatively be utilized within the coolant subsystem 64.

In operation, the coolant pump 72 circulates coolant through the coolant subsystem 64. The coolant pump 72 may be powered by electrical or non-electrical power sources. For example, the coolant pump 72 could be operatively coupled to the engine 14, or could be driven by an electrically powered motor. The coolant pump 72 receives coolant from the engine 14 and circulates the coolant in a closed loop. For example, when the climate control system 56 is operating in a heating mode, coolant may be routed from the coolant pump 72 to the intermediate heat exchanger 74, thereby bypassing the radiator 70, and then to the heater core 76 before returning to the engine 14. When the engine 14 is outputting relatively high levels of thermal energy, coolant may flow from the coolant pump 72 to the radiator 70 before returning to the engine 14 via the intermediate heat exchanger 74 and the heater core 76. The valve 84 directs coolant from the coolant pump 72 either through the radiator 70 or around the radiator 70 to the valve 82. Coolant may flow through or around the engine 14 based on the position of the valve 82.

The intermediate heat exchanger 74 may facilitate the transfer of thermal energy between the coolant subsystem 64 and the heat pump subsystem 66. For example, heat may be transferred from the heat pump subsystem 66 to the coolant subsystem 64, or visa-versa. In one embodiment, the intermediate heat exchanger 74 is disposed as part of both the coolant subsystem 64 and the heat pump subsystem 66. The intermediate heat exchanger 74 can include any suitable configuration. For example, the intermediate heat exchanger 74 may have a plate-fin, tube-fin, or tube-and-shell configuration that facilitates the transfer of thermal energy between the heat pump subsystem 66 and the coolant subsystem 64 without mixing or exchanging the heat transfer fluids of these systems.

In some conditions, the heater core 76 may transfer thermal energy from the engine coolant to air in the passenger compartment 58. The heater core 76 is located within the passenger compartment 58 in a section of the ventilation subsystem 68 and could embody any suitable configuration. In one embodiment, the heater core 76 is configured as a plate-fin or tube-fin heat exchanger. However, other heater core configurations are contemplated as within the scope of this disclosure. In another embodiment, the heater core 76 is located outside of the passenger compartment 58.

The bypass loop 80 routes coolant in such a way that it is not heated by the engine 14. The valve 82 may control the flow of coolant through the bypass loop 80. For example, when in a first position, the valve 82 may prevent coolant from flowing through a bypass line 90 and inhibit the flow of coolant from the engine 14 to the intermediate heat exchanger 74. In such a position, an auxiliary coolant pump 92 may circulate coolant through the bypass loop 80 from the intermediate heat exchanger 74 to the heater core 76, then to the bypass line 90, and back to the auxiliary coolant pump 92. As such, the coolant in the coolant subsystem 64 may be heated independently by the heat pump subsystem 66 via the intermediate heat exchanger 74. The valve 82 may also inhibit the flow of coolant through the bypass line 90 when positioned in a second position. The auxiliary coolant pump 92 may or may not circulate coolant when coolant does not flow through the bypass line 90.

The heat pump subsystem 66, or refrigerant loop, may circulate a refrigerant to transfer thermal energy to or from the passenger compartment 58 and/or to or from the coolant subsystem 64. In one embodiment, the heat pump subsystem 66 is configured as a vapor compression heat pump system in which a fluid, such as refrigerant, is circulated through the heat pump subsystem 66 to transfer thermal energy to or from the passenger compartment 58.

The heat pump subsystem 66 may be controlled to operate in various modes, including but not limited to, a cooling mode and a heating mode. In the cooling mode, the heat pump subsystem 66 may circulate refrigerant to transfer thermal energy from inside the passenger compartment 58 to outside the passenger compartment 58. In a heating mode, the heat pump subsystem 66 may transfer thermal energy from the refrigerant to the coolant of the coolant subsystem 64 via the intermediate heat exchanger 74 without circulating the refrigerant through any heat exchanger located in the passenger compartment 58. Other modes may also be implemented, as discussed in greater detail below.

In one embodiment, the heat pump subsystem 66 includes a compressor 94, the intermediate heat exchanger 74, a first expansion device 98, a solenoid valve 99, an outside heat exchanger 100, a three-way valve 102, an accumulator 106, a second expansion device 108, and an evaporator 110. Components of the heat pump subsystem 66 may be in fluidic communication via one or more conduits, such as tubes, hoses or the like.

The compressor 94 pressurizes and circulates the refrigerant through the heat pump subsystem 66. The compressor 94 may be powered by an electrical or non-electrical power source. For example, the compressor 94 may be operatively coupled to the engine 14 or driven by an electrically powered motor. The compressor 94 directs high pressure refrigerant to the intermediate heat exchanger 74, which in turn may transfer heat from the high pressure refrigerant to coolant passing through the intermediate heat exchanger 74 to heat the coolant of the coolant subsystem 64.

The first expansion device 98 is positioned between and in fluidic communication with both the intermediate heat exchanger 74 and the outside heat exchanger 100. The first expansion device 98 is adapted to change the pressure of the refrigerant of the heat pump subsystem 66. For example, the first expansion device 98 may be an electronic expansion valve, a thermal expansion valve (TXV) or a fixed area valve, such as a fixed orifice tube, that may or may not be externally controlled. The first expansion device 98 may reduce the pressure of the refrigerant that passes through the first expansion device 98 from the intermediate heat exchanger 74 to the outside heat exchanger 100. Therefore, high pressure refrigerant received from the intermediate heat exchanger 74 may exit the first expansion device 98 at a lower pressure and as a liquid and vapor mixture in the heating mode.

The solenoid valve 99 may be positioned in a bypass line 122 that permits a portion of the refrigerant to bypass the first expansion device 98. The solenoid valve 99 may be opened during cooling mode and closed during heating mode. When opened, a majority of the refrigerant flow is passed through the solenoid valve 99 since it provides the path of least resistance. When the solenoid valve 99 is closed, all refrigerant flow is passed through the first expansion device 98 to meter the refrigerant flow into the outside heat exchanger 100.

The outside heat exchanger 100 may be positioned within the engine compartment 60. In the cooling mode or air conditioning context, the outside heat exchanger 100 may function as a condenser to transfer heat to the surrounding environment by condensing the refrigerant from a vapor to a liquid. In the heating mode, the outside heat exchanger 100 may function as an evaporator to transfer heat from the surrounding environment to the refrigerant, thereby causing the refrigerant to vaporize.

The three-way valve 102 may be positioned between the outside heat exchanger 100 and both the accumulator 106 and the evaporator 110. The three-way valve 102 can control the flow of refrigerant that exits the outside heat exchanger 100. In the heating mode, the three-way valve 102 is actuated to permit refrigerant to flow from the outside heat exchanger 100 to the accumulator 106 along a bypass line 104, thereby bypassing flow through the evaporator 110. The three-way valve 102 may alternatively be positioned to permit flow of the refrigerant to the evaporator 110 along line 112, such as during the cooling mode.

The accumulator 106 acts as a reservoir for storing any residual liquid refrigerant so that vapor refrigerant rather than liquid refrigerant is provided to the compressor 94. The accumulator 106 includes a desiccant that absorbs relatively small amounts of water moisture from the refrigerant.

The second expansion device 108 may be positioned between and in fluid communication with the outside heat exchanger 100 and the evaporator 110. In this embodiment, the second expansion device 108 is located in line 112. The second expansion device 108 may have a similar structure as the first expansion device 98 and is configured to change the pressure of the refrigerant similar to the first expansion device 98. In one embodiment, the second expansion device 108 is closed to inhibit the flow of refrigerant from the outside heat exchanger 100 to the evaporator 110 in the heating mode. In another embodiment, the second expansion device 108 is open to permit the flow of refrigerant from the outside heat exchanger 100 to the evaporator 110 in the cooling mode.

The evaporator 110 is fluidly connected to the second expansion device 108. The evaporator 110 may be positioned inside the passenger compartment 58. In the cooling mode, the evaporator 110 receives heat from air in the passenger compartment 58 to vaporize the refrigerant. Refrigerant exiting the evaporator 110 is routed to the accumulator 106. In the heating mode, the three-way valve 102 routes the refrigerant to the accumulator 106, bypassing the evaporator 110.

The ventilation subsystem 68 may circulate air in the passenger compartment 58. In one embodiment, the ventilation subsystem 68 includes a front housing 124. For example, the front housing 124 may be positioned under an instrument panel of the electrified vehicle 12 for circulating air in portions of the passenger compartment 58.

The front housing 124 of the ventilation subsystem 68 may house a blower 128 and a temperature door 130. An air intake portion 132 may receive air 134 from outside the electrified vehicle 12 and/or air from inside the passenger compartment 58. For example, the air intake portion 132 may receive ambient air from outside the electrified vehicle 12 via an intake passage, duct or opening that is located in any suitable location, such as proximate a cowl, wheel well, or other vehicle body panel. The air intake portion 132 may also receive air from inside the passenger compartment 58 and recirculate this air through the ventilation subsystem 68. One or more doors or louvers may also be provided to permit or inhibit air circulation.

The blower 128, also called a blower fan, is positioned near the air intake portion 132 and can be configured as a centrifugal fan that circulates air through the front housing 124 of the ventilation subsystem 68.

In one embodiment, the temperature door 130 is positioned between the evaporator 110 and the heater core 76 and may be positioned downstream of the evaporator 110 and upstream of the heater core 76. The temperature door 130 blocks or permits the flow of air 134 through the heater core 76 to help control the temperature of air in the passenger compartment 58. For example, the temperature door 130 may permit airflow through the heater core 76 in the heating mode such that heat may be transferred from the coolant to air passing through the heater core 76. This heated air may then be provided to a plenum for distribution to ducts and vents or outlets located in the passenger compartment 58. The temperature door 130 may be moved between a plurality of positions to provide air having a desired temperature. In the embodiment of FIG. 2, the temperature door 130 is shown in a full heat position in which the flow of air 134 is directed through the heater core 76.

The climate control system 56 may additionally be operated in an engine cooling assist mode in order to cool the coolant that circulates in the coolant subsystem 64 during certain conditions. For example, under extreme operating conditions, the radiator 70 may be incapable of preventing the coolant of the coolant subsystem 64 from overheating when the engine 14 is turned ON. For example, a component of the coolant subsystem 64, such as the coolant pump 72, may fail, thereby causing the coolant to overheat.

During such an overheating condition, the heat pump subsystem 66 may assist the coolant subsystem 64 by removing heat from the coolant and thereby assist in cooling the engine 14. For example, heat from the coolant of the coolant subsystem 64 may be transferred from the coolant to the refrigerant within the intermediate heat exchanger 74, which is fluidly connected to both the coolant subsystem 64 and the heat pump subsystem 66. The heat that is transferred into the refrigerant may thereafter be released to the ambient air via the outside heat exchanger 100 of the heat pump subsystem 66.

In one non-limiting embodiment of an engine cooling assist mode, the valve 82 of the coolant subsystem 64 is opened to allow coolant flow though the engine 14 where it picks up heat which can be subsequently delivered to the refrigerant via the intermediate heat exchanger 74. When the valve 82 is opened, the auxiliary coolant pump 92 may be turned ON to circulate the coolant through the intermediate heat exchanger 74, then through the heater core 76, and then through the bypass loop 80 before returning to the intermediate heat exchanger 74. Actuating the auxiliary coolant pump 92 may also provide some coolant flow to the radiator 70. The coolant is cooled by the refrigerant of the heat pump subsystem 66 as is circulates through the intermediate heat exchanger 74.

Meanwhile, in the heat pump subsystem 66, the first expansion device 98 and the solenoid valve 99 are opened and the second expansion device 108 is closed such that the refrigerant flows from the compressor 94, through the intermediate heat exchanger 74, then through the first expansion device 98 and the solenoid valve 99, through the outside heat exchanger 100, and finally through the accumulator 106 from the bypass line 104. The heat picked up by the refrigerant from the coolant within the intermediate heat exchanger 74 is dissipated to ambient air as it passes through the outside heat exchanger 100. Opening the first expansion device 98 and the solenoid valve 99 in parallel provides some resistance to the refrigerant flow, which combined with the refrigerant pressure drop in the lines and the outside heat exchanger 100 helps offset the delta pressure across the compressor 94.

In one engine cooling assist mode embodiment, the compressor 94 may be operated at low or medium speed in order to avoid overheating the refrigerant. In other words, running the compressor 94 at low or medium speeds helps maintain the refrigerant temperature below the coolant temperature for a longer period of time.

In another embodiment, operation in the engine cooling assist mode is continued until a temperature of the refrigerant rises above a temperature of the coolant. The heat pump subsystem 66 may be disabled by turning the compressor OFF if the refrigerant temperature exceeds the coolant temperature.

The controller 88 may be part of an overall vehicle control unit, such as a vehicle system controller (VSC), or could alternatively be a stand-alone control unit separate from the VSC. In one embodiment, the controller 88 includes executable instructions for interfacing with and operating the various components of the climate control system 56. The controller 88 may include inputs 144 and outputs 146 for interfacing with the various components of the climate control system 56. The controller 88 may also include a separate processing unit 148 and non-transitory memory 150 for executing the various control strategies and modes of the climate control system 56.

Figure 3:
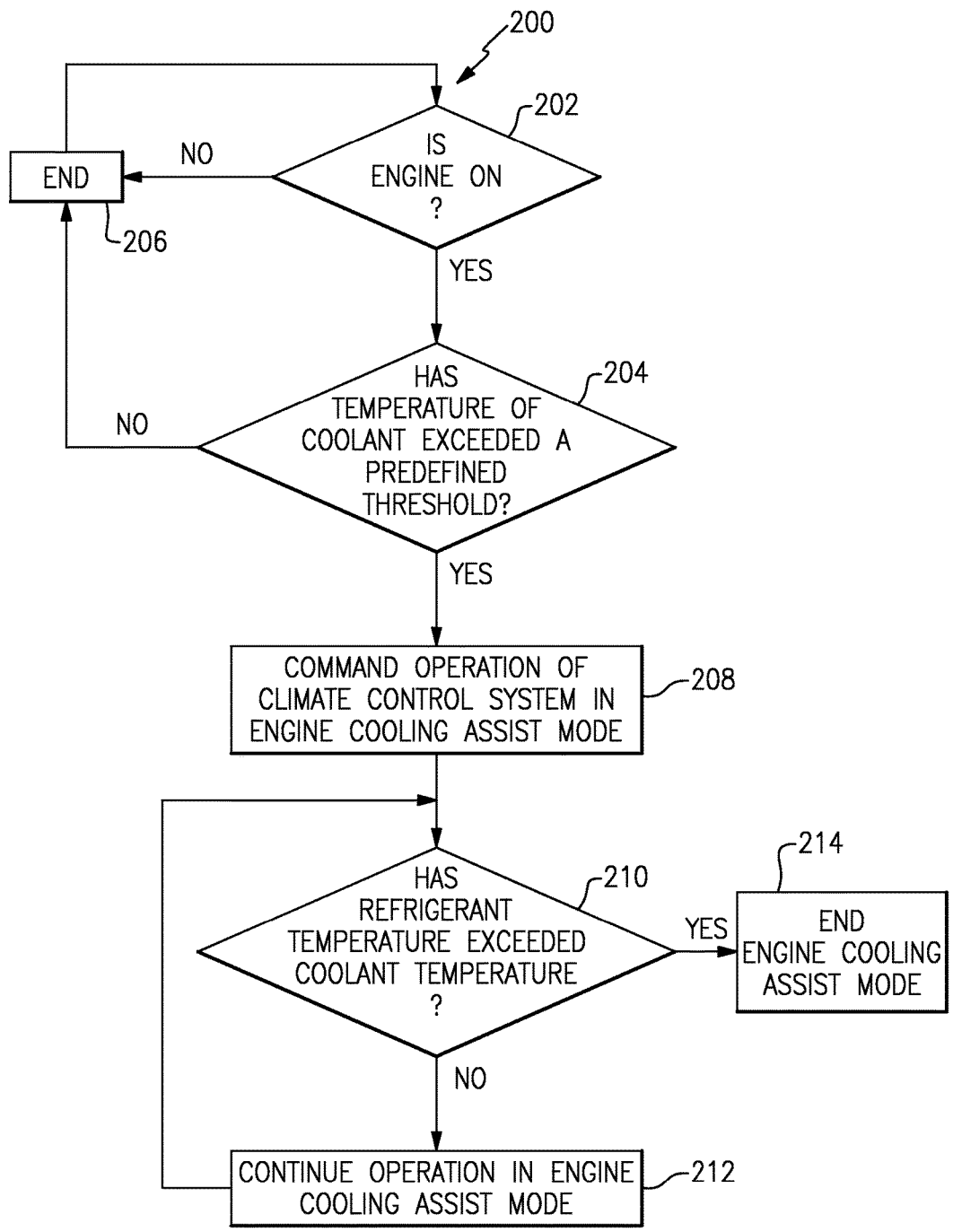
FIG. 3 schematically illustrates an exemplary control strategy for controlling a climate control system of an electrified vehicle in an engine cooling assist mode.

FIG. 3, with continued reference to FIGS. 1 and 2, schematically illustrates a control strategy 200 for controlling operation of the climate control system 56 of the electrified vehicle 12 in an engine cooling assist mode. For example, the control strategy 200 may be executed during certain conditions to assist in cooling the engine 14 of the electrified vehicle 12. Of course, the electrified vehicle 12 is capable of implementing and executing other control strategies within the scope of this disclosure. In one embodiment, the controller 88 of the climate control system 56 is programmed with one or more algorithms adapted to execute the control strategy 200, or any other control strategy. In other words, the control strategy 200 may be stored as executable instructions in the non-transitory memory 150 of the controller 88. In another embodiment, the control strategy 200 is stored in the vehicle system controller (VSC), which can communicate with the controller 88 to set the mode of the climate control system 56.

As shown in FIG. 3, the control strategy 200 may begin at block 202 by determining if the engine 14 is ON. If the engine 14 is ON, such as during HEV operation of the electrified vehicle 12, the control strategy 200 proceeds to block 204. If the engine 14 is OFF, the control strategy ends at block 206.

At block 204, the control strategy 200 determines whether a temperature of the coolant of the coolant subsystem 64 has exceeded a predefined threshold. In one embodiment, the temperature of the coolant may be measured at an outlet of the engine 14 by a sensor 78 (see FIG. 2) of the coolant subsystem 64. The sensor 78 may be positioned between the engine 14 and the coolant pump 72, in one embodiment.

The sensor 78 communicates temperature information to the controller 88. In one non-limiting embodiment, the controller 88 may compare the temperature information received from the sensor 78 with a stored threshold value, such as within a look-up table stored on the non-transitory memory 150. The predefined threshold may be defined at a temperature that indicates overheating or indicates that the coolant is in danger of overheating.

If the temperature of the coolant exceeds the predefined threshold, the control strategy 200 proceeds to block 208. However, if the predefined threshold temperature has not been exceeded, the control strategy 200 may end at block 206. Blocks 202 and 204 may be periodically executed to continuously monitor the coolant of the coolant subsystem 64.

The control strategy 200 may command operation of the climate control system 56 in the engine cooling assist mode at block 208 if the engine 14 is ON and the coolant temperature exceeds a predefined threshold. During engine cooling assist mode, the heat pump subsystem 66 assists the coolant subsystem 64 to remove heat from the coolant, and by extension, the engine 14. In one non-limiting embodiment, heat from the coolant of the coolant subsystem 64 is transferred from the coolant to the refrigerant within the intermediate heat exchanger 74, and this heat is subsequently released to the ambient air via the outside heat exchanger 100 of the heat pump subsystem 66.

In another non-limiting embodiment, one or more of the following actions may be performed in response to commanding the engine cooling assist mode at block 208:
the valve 82 of the coolant subsystem 64 is opened so that the coolant flow is maintained through the engine 14;
the auxiliary coolant pump 92 is turned ON to maintain some coolant flow through the radiator 70 and to enable heat transfer in the intermediate heat exchanger 74;
the second expansion device 108 of the heat pump subsystem 66 is closed and the first expansion device 98 and solenoid valve 99 are opened to circulate refrigerant through a loop that includes the compressor 94, the intermediate heat exchanger 74, the first expansion device 98, the solenoid valve 99, the outside heat exchanger 100, the three-way valve 102, and the accumulator 106; and/or the compressor 94 is operated at either low or medium speed.

Additional or alternative steps may be performed during the engine cooling assist mode within the scope of this disclosure.

Next, at block 210, the control strategy 200 determines whether the refrigerant temperature has risen above the coolant temperature. In one embodiment, the controller 88 monitors the temperature of the coolant at the inlet of the intermediate heat exchanger 74, monitors a temperature of the refrigerant at discharge from the compressor 94, and then compares these temperatures to determine whether the refrigerant temperature has exceeded the coolant temperature. One or more sensors may be incorporated into the climate control system 56 for measuring temperatures and communicating temperature information to the controller 88.

If the refrigerant temperature has not exceeded the coolant temperature, the control strategy 200 continues operation of the climate control system 56 in engine cooling assist mode at block 212. Alternatively, if the refrigerant temperature has exceeded the coolant temperature block 210, the engine cooling assist mode is ended at block 214. In one embodiment, the engine cooling assist mode is ended by disabling the heat pump subsystem 66. For example, the heat pump subsystem 66 may be disabled by turning the compressor 94 OFF.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

We claim:

1. A method, comprising:
controlling a climate control system of an electrified vehicle in an engine cooling assist mode to cool a coolant of a coolant subsystem with a refrigerant of a heat pump subsystem in response to a temperature of the coolant exceeding a predefined threshold, wherein the controlling step includes inhibiting the refrigerant from flowing through an evaporator of the heat pump subsystem during the engine cooling assist mode.

2. The method as recited in claim 1, wherein the controlling step includes:
transferring heat from the coolant to the refrigerant in an intermediate heat exchanger that is disposed as part of both the coolant subsystem and the heat pump subsystem; and
releasing the heat to ambient air via an outside heat exchanger of the heat pump subsystem.

3. The method as recited in claim 1, wherein the controlling step includes turning on an auxiliary pump to circulate the coolant through a radiator of the coolant subsystem.

4. The method as recited in claim 1, wherein the controlling step includes opening a valve of the coolant subsystem in order to maintain flow of the coolant through an engine.

5. The method as recited in claim 1, wherein the controlling step includes operating the heat pump subsystem by communicating the refrigerant through a compressor, an intermediate heat exchanger, an expansion valve, a solenoid valve, an outside heat exchanger, and an accumulator.

6. The method as recited in claim 1, wherein the controlling step includes operating a compressor at low or medium speed.

7. The method as recited in claim 1, comprising monitoring a difference between an inlet temperature of the coolant at an intermediate heat exchanger and a discharge temperature of the refrigerant at a compressor.

8. The method as recited in claim 1, comprising ending the controlling step if a temperature of the refrigerant exceeds the temperature of the coolant.

9. The method as recited in claim 1, wherein the heat pump subsystem is a vapor compression heat pump system.

10. The method as recited in claim 1, wherein the controlling step includes circulating the coolant through an intermediate heat exchanger, then through a heater core, and then through a bypass loop of the coolant subsystem before returning the coolant to the intermediate heat exchanger during the engine cooling assist mode.

11. A method, comprising:
monitoring a temperature of a coolant of an engine of an electrified vehicle;
operating a climate control system of the electrified vehicle in an engine cooling assist mode in which heat is exchanged between the coolant and a refrigerant within an intermediate heat exchanger, wherein the refrigerant circulates through an accumulator during the engine cooling assist mode; and
dissipating the heat from the refrigerant to ambient air within an outside heat exchanger.

12. The method as recited in claim 11, wherein the coolant is part of a coolant subsystem and the refrigerant is part of a heat pump subsystem.

13. The method as recited in claim 11, comprising at least one of:
opening a valve to bypass flow of the coolant through the engine;
turning on an auxiliary pump to circulate the coolant through a radiator; and
operating a compressor at low or medium speed.

14. The method as recited in claim 11, wherein operating the climate control system includes bypassing an evaporator of a heat pump subsystem during the engine cooling assist mode.

15. The method as recited in claim 11, wherein operating the climate control system includes opening an expansion device and a solenoid valve in parallel to allow the refrigerant to flow through the outside heat exchanger.

16. A climate control system for an electrified vehicle, comprising:
a coolant subsystem that circulates a coolant to cool an engine;
a heat pump subsystem that circulates a refrigerant; and
a controller configured to operate said climate control system in an engine cooling assist mode in which said coolant transfers heat to said refrigerant without said refrigerant flowing through an evaporator in response to a temperature of said coolant exceeding a predefined threshold.

17. The system as recited in claim 16, wherein said coolant subsystem includes a coolant pump, a radiator, at least one valve, an intermediate heat exchanger, and a heater core.

18. The system as recited in claim 16, wherein said heat pump subsystem includes a compressor, an intermediate heat exchanger, a first expansion device, a solenoid valve, an outside heat exchanger, a three-way valve, a second expansion device and an accumulator.

19. The system as recited in claim 16, comprising an intermediate heat exchanger fluidly connected to both said coolant subsystem and said heat pump subsystem and adapted to effectuate heat transfer between said coolant and said refrigerant.

20. The system as recited in claim 16, wherein said heat pump subsystem includes an outside heat exchanger that dissipates said heat to ambient air.

\* \* \* \* \*